US009126130B2

(12) United States Patent
Killian et al.

(10) Patent No.: US 9,126,130 B2
(45) Date of Patent: Sep. 8, 2015

(54) FLUID VESSEL WITH ABRASION AND CORROSION RESISTANT INTERIOR CLADDING

(75) Inventors: Michael Lee Killian, Troy, MI (US); John Trublowski, Troy, MI (US); Christopher S. Rau, Battle Creek, MI (US); Derek R. Thelen, Edison, NJ (US)

(73) Assignee: Eaton Corporation, Cleveland, OH (US)

( * ) Notice: Subject to any disclaimer, the term of this patent is extended or adjusted under 35 U.S.C. 154(b) by 865 days.

(21) Appl. No.: 13/097,720

(22) Filed: Apr. 29, 2011

(65) Prior Publication Data
US 2012/0273487 A1 Nov. 1, 2012

(51) Int. Cl.
*B01D 35/30* (2006.01)
*B65D 90/02* (2006.01)
*B23K 31/02* (2006.01)
(Continued)

(52) U.S. Cl.
CPC ............ *B01D 35/30* (2013.01); *B23K 26/0823* (2013.01); *B23K 26/1411* (2013.01); *B23K 26/3206* (2013.01); *B23K 26/345* (2013.01); *B23K 31/02* (2013.01); *B23K 35/0244* (2013.01); *B23K 35/3033* (2013.01); *B23K 35/3046* (2013.01); *B23K 35/32* (2013.01); *B23K 2201/06* (2013.01); *B23K 2201/34* (2013.01);
(Continued)

(58) Field of Classification Search
CPC ...... B01D 35/00; B01D 35/30; B01D 35/308; B01D 2201/29; B01D 2201/291; B01D 2201/30; B01D 2291/302; B01D 2201/303; C02F 2201/002; F16L 9/14; F16L 9/18; B65D 1/42; B65D 1/46; B65D 1/48; B32B 15/01; B32B 15/011; B32B 15/013; B32B 15/015; B23K 26/00; B23K 26/206; B23K 26/246
USPC .............. 210/500.1, 435, 441, 447, 449, 451, 210/453, 455, 499, 232, 299, 310, 450; 220/62.17; 219/121.64, 121.6, 121.63; 427/596, 597, 8, 319; 118/708, 712, 118/641; 228/121, 124.6, 175, 177; 138/140–143, 145, 146, 153; 428/615
See application file for complete search history.

(56) References Cited

U.S. PATENT DOCUMENTS 3,834,539 A * 9/1974 Thompson ................ 210/167.32
4,609,459 A * 9/1986 Hendrix .......................... 210/91
(Continued)

FOREIGN PATENT DOCUMENTS

| EP | 1264916 A1 | 12/2002 |
| JP | 2001239108 A | 9/2001 |
| TW | 345640 U | 12/2008 |

*Primary Examiner* — Joseph Drodge
*Assistant Examiner* — Madeline Gonzalez
(74) *Attorney, Agent, or Firm* — Quinn Law Group, PLLC

(57) ABSTRACT

A fluid vessel includes a body structure defining a cavity, an inlet structure defining a first channel, and an outlet structure defining a second channel. The body structure includes an overlay material surrounding the cavity, and includes a metal substrate surrounding the overlay material. The first channel and second channel are provided in fluid communication with the cavity. The inlet structure and outlet structure each include an overlay material surrounding the respective first channel and second channel, and include a metal substrate surrounding the respective overlay material. The overlay material of each of the body structure, the inlet structure, and the outlet structure is fused to the respective metal substrate of the body structure, the inlet structure, and the outlet structure through laser cladding.

19 Claims, 3 Drawing Sheets

(51) Int. Cl.
*B23K 26/08* (2014.01)
*B23K 26/14* (2014.01)
*B23K 26/32* (2014.01)
*B23K 26/34* (2014.01)
*B23K 35/30* (2006.01)
*B23K 35/32* (2006.01)
*B23K 35/02* (2006.01)
*B01D 35/00* (2006.01)
*B23K 26/00* (2014.01)

(52) U.S. Cl.
CPC ......... *B23K 2203/04* (2013.01); *B23K 2203/08* (2013.01)

(56) References Cited

U.S. PATENT DOCUMENTS

| | | | | |
|---|---|---|---|---|
| 5,944,991 | A * | 8/1999 | Shellenbarger et al. | 210/232 |
| 6,162,354 | A * | 12/2000 | Yang et al. | 210/136 |
| 6,548,125 | B2 * | 4/2003 | Warnecke | 427/597 |
| 2003/0201263 | A1 * | 10/2003 | Morikage et al. | 219/136 |
| 2008/0053243 | A1 * | 3/2008 | Kimball et al. | 73/861.63 |
| 2008/0226843 | A1 * | 9/2008 | Fukubayashi et al. | 427/597 |
| 2009/0291197 | A1 * | 11/2009 | Bartels et al. | 427/8 |
| 2010/0096310 | A1 * | 4/2010 | Yoshida | 210/151 |
| 2011/0022335 | A1 * | 1/2011 | Foucault et al. | 702/47 |

* cited by examiner

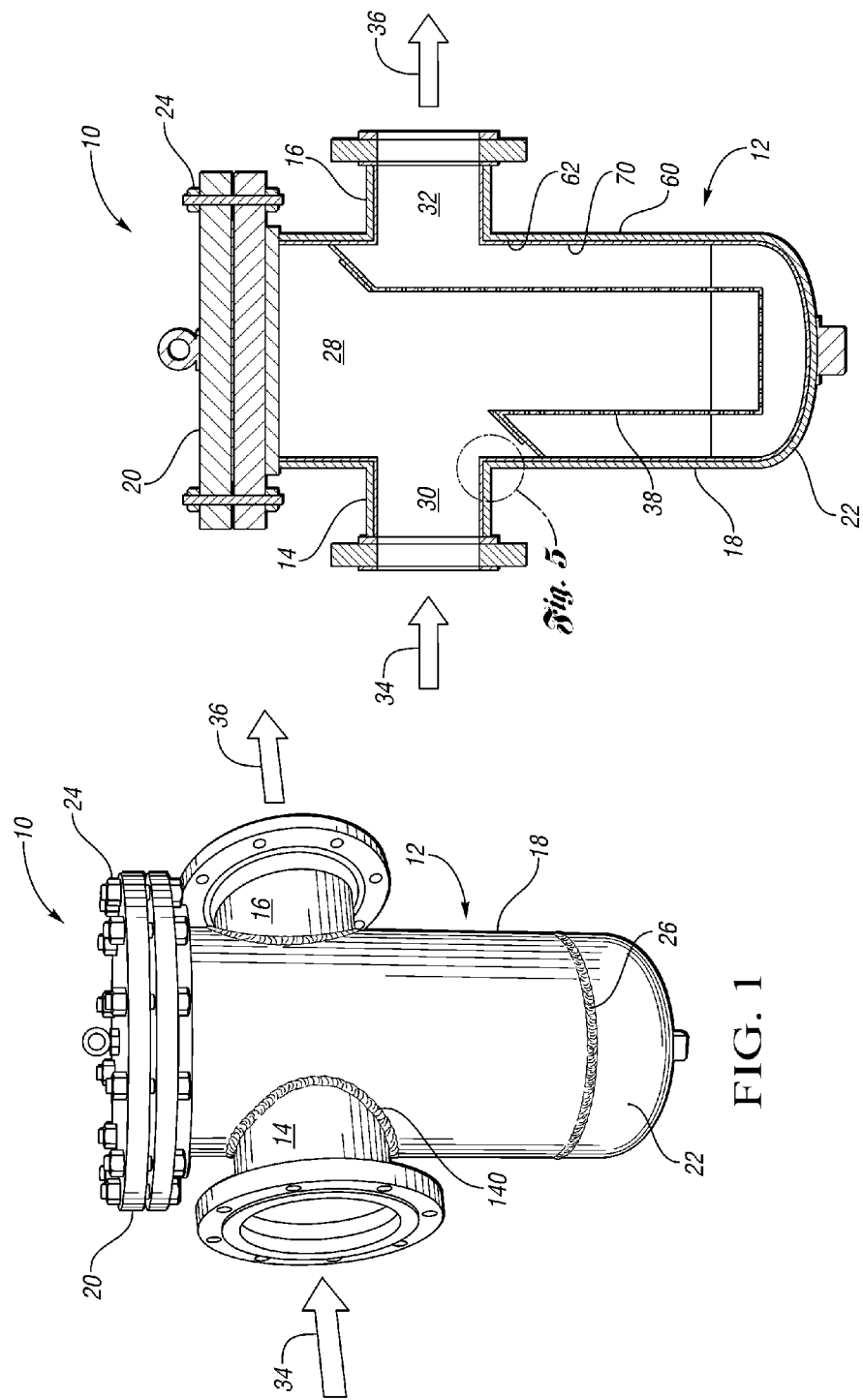

FLUID VESSEL WITH ABRASION AND CORROSION RESISTANT INTERIOR CLADDING

TECHNICAL FIELD

The present invention generally relates to corrosion resistant fluid vessels and methods for making the same.

BACKGROUND

Fluid vessels are often used in applications where corrosive fluids must be isolated from their surroundings. In one application, a fluid vessel may include an inlet structure, outlet structure, and filter medium, and may be used to strain particulate matter from a fluid flow. Ships, oil rigs, desalinization plants, and power plants, for example, use such "strainers" to remove debris and particles from seawater before the water is allowed to enter cooling systems and/or machinery. In such applications, the saline and oxygen-rich seawater may be highly corrosive to ferrous metals in contact with the water flow. Likewise, the seawater may contain small particles of silica, sand, and/or other hard particles like calcium carbonate (e.g., ground up sea shells) that may contact, impinge on and/or abrade the walls of the vessel. If the vessel walls are not sufficiently hard, prolonged exposure to these flowing particles may cause excessive wear and may reduce the vessel's expected life.

SUMMARY

A fluid vessel may include a body structure that defines a cavity, an inlet structure that defines a first channel, and an outlet structure that defines a second channel. The body structure may include an overlay material surrounding the cavity, and may include a metal substrate surrounding the overlay material. The first channel and second channel are provided in fluid communication with the cavity. Similar to the body structure, the inlet structure and outlet structure may each include an overlay material that surround the respective first channel and second channel, and may include a metal substrate that surrounds the respective overlay material. The overlay material of each of the body structure, the inlet structure, and the outlet structure may be fused to the respective metal substrate of the body structure, the inlet structure, and the outlet structure, for example, through laser cladding.

In one configuration, the overlay material may have an iron content of less than about 7 percent by weight, and the metal substrate may have an iron content of greater than or equal to about 90 to 95 percent iron by weight. Additionally, the overlay material may include an element selected from the group including nickel, cobalt, chromium, and combinations thereof. The laser cladding method of fusing the overlay material to the metal substrate may result in a welding dilution that is less than or equal to about 4 percent by weight.

The body structure of the fluid vessel may further include a first end cap, a second end cap, and a central portion, where the first end cap and second end cap are disposed on substantially opposing ends of the central portion, with at least one of the first end cap and the second end cap being welded to the central portion. Additionally, a filter media may be disposed within the cavity and be in fluid communication with each of the first channel and the second channel. The filter media may be operatively positioned such that the first channel and the second channel are on substantially opposing sides of the filter media. In one configuration, the filter media may be a screen filter.

The inlet structure and outlet structure of the fluid vessel may be each joined to the body structure through a layered weld, where the layered weld may include a root weld and a filler weld. In one configuration, the root weld may include an element selected from the group including nickel, cobalt, chromium, and combinations thereof.

Similarly, a method of manufacturing a fluid vessel, such as a seawater strainer, may include fusing a powdered overlay material to the inner surfaces of a body structure, an inlet structure, and an outlet structure through laser cladding, and welding each of the inlet structure and outlet structure to the body structure. In an embodiment, each of the body structure, the inlet structure, and the outlet structure may include a metal substrate having a respective iron content of greater than or equal to about 90 to 95 percent iron by weight. Additionally the powdered overlay material may have an iron content of less than or equal to about 7 percent by weight, and may include an element selected from the group including nickel, cobalt, chromium, and combinations thereof.

The welding process may include forming a root weld and forming a filler weld, wherein the root weld material may include an element selected from the group including nickel, cobalt, chromium, and combinations thereof. Furthermore, the overlay material may be post-processed, such as by rough finishing or work-hardening.

Finally, the method may include placing a filter media within the body structure, with the filter media in fluid communication with each of the inlet structure and the outlet structure, and operatively positioned such that the inlet structure and the outlet structure are on substantially opposing sides of the filter media.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a perspective view of an embodiment of a seawater strainer.

FIG. 2 is a schematic cross-sectional view of the seawater strainer of FIG. 1.

DETAILED DESCRIPTION

Figure 3:
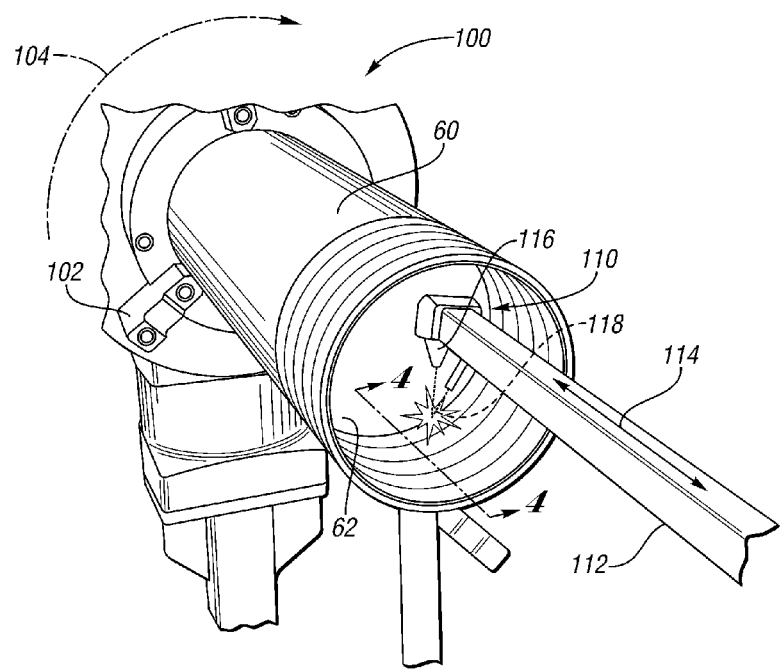
FIG. 3 is a perspective view of a laser cladding apparatus applying an overlay material to the inner surface of a tubular metal substrate.

Referring to the drawings, wherein like reference numerals refer to like components, FIG. 1 generally illustrates a fluid vessel 10 having a body structure 12, an inlet structure 14, and an outlet structure 16. In one configuration, the body structure 12 may be constructed from a tubular central section 18 a first end cap 20 and a second end cap 22, where the first and second end caps 20, 22 are disposed on substantially opposing ends of the central section 18 as shown. Each respective end cap 20, 22 may be joined to the central section 18 using a fastening means, where the fastening means may be selected to provide a substantially water-proof seal between each end cap 20, 22 and the central section 18. For example, as shown in FIG. 1, the first end cap 20 is removably joined to the central section 18 using a plurality of bolts (e.g., bolt 24) to couple the end cap 20 to a mating flange of the central section 18. Conversely, the second end cap 22 is rigidly joined to the central section 18 via a weld 26.

As illustrated in the cross-sectional view of the fluid vessel 10 provided in FIG. 2, the body structure 12 may generally define a cavity 28. Similarly, the inlet structure 14 may define a first channel 30, and the outlet structure 16 may define a second channel 32. The first and second channels 30, 32 may each be in fluid communication with the cavity 28, such that the inlet structure 14 may permit fluid to flow 34 into the cavity 28 and the outlet structure 16 may permit fluid to flow 36 out of the cavity 28. The direction or magnitude of the respective fluid flows 34, 36 should not, however, be used to limit the scope of the invention.

In an embodiment, the fluid vessel 10 may include a filter media 38 disposed within the cavity 28 and in fluid communication with each of the first and second channels 30, 32. The filter media 38 may be operatively positioned such that substantially all fluid flow 34 provided through the first channel 30 must pass through the filter media 38 before exiting the second channel 32 (i.e., the first channel 30 and the second channel 32 are on substantially opposing sides of the filter media 38). In one embodiment, the filter media 38 may be a screen filter, which may include a rigid or flexible screen having a multitude of perforations or openings, and may be operative to separate sand and/or other fine particles from an inlet structure fluid flow 34 before the fluid is permitted to flow through the outlet structure 16. The size of the perforations or openings in the screen filter may be determined by the expected size of the material that may be suspended in the fluid and/or by the operating characteristics of the downstream system.

The body structure 12, the inlet structure 14, and the outlet structure 16 may be constructed from a metal substrate 60 and an overlay material 70, where the overlay material 70 lines the inward facing surface 62 of the metal substrate 60. Said another way, the overlay material 70 may surround the cavity 28, the first channel 30, and the second channel 32, while the metal substrate 60 may then surround the overlay material 70.

In one configuration, the metal substrate 60 may be a ferrous metal, such as a steel, and/or may be formed from, for example, carbon steel, alloy steel, stainless steel, tool steel, cast iron, and combinations thereof. As such, the metal substrate 60 may, for example, have an iron content of above about 90-95% iron by weight (i.e., greater than or equal to about 90-95 parts by weight based on 100 parts by weight of the metal substrate). In one embodiment, the metal substrate 60 may be a steel alloy, such as for example, quenched and tempered SAE 4340 steel, which may have a relatively high strength to weight ratio, though may be available at a lower cost than comparably strong, corrosion-resistant materials. Despite its strength properties, however, SAE 4340 steel may be likely to corrode when exposed to salt water, such as when used in a seawater strainer application. Therefore a thin layer of the overlay material 70 may be used to line the inner surface 62 of the metal substrate 60 to enhance the hardness, wear-resistance, and/or corrosion-resistance qualities of the metal substrate 60, as set forth in more detail below.

The overlay material 70 may include a metal alloy that, for example, may include an element selected from the group including nickel, cobalt, chromium, and combinations thereof. Nickel and/or cobalt may be present in the metal alloy to provide corrosion-resistance to the overlay material 70. More specifically, nickel and/or cobalt may be present in the metal alloy in an amount from about 1 part to about 90 parts by weight based on 100 parts by weight of the metal alloy. For example, a suitable nickel-containing metal alloy may include about 65 parts by weight nickel, about 20 parts by weight chromium, about 8 parts by weight molybdenum, about 3.5 parts by weight of a combination of niobium and tantalum, and about 4.5 parts by weight of iron based on 100 parts by weight of the metal alloy, and may be commercially available under the trade name INCONEL® 625 from Special Metals Corporation of New Hartford, N.Y. Likewise, a suitable metal cobalt-containing alloy may include about 54 parts by weight cobalt, about 26 parts by weight chromium, about 9 parts by weight nickel, about 5 parts by weight molybdenum, about 3 parts by weight iron, about 2 parts by weight tungsten, and about 1 part by weight of a combination of manganese, silicon, nitrogen, and carbon, and may be commercially available under the trade name ULTIMET® from Haynes International, Inc. of Kokomo, Ind. Further, other suitable non-limiting examples of metal alloys may include alloys commercially available under the trade names EATONITE™ ABC-L1 alloy from Eaton Corporation of Cleveland, Ohio, MICRO-MELT® CCW alloy from Carpenter Technology Corporation of Reading, Pa., and STELLITE® 21 from Stellite Coatings of Goshen, Ind. In an embodiment, to facilitate corrosion-resistance qualities, the overlay material 70 may have an iron content of less than about 7% by weight (i.e., less than or equal to about 7 parts by weight based on 100 parts by weight of the overlay material). In another embodiment, however, the iron content of the overlay material 70 may be less than about 4% by weight (i.e., less than or equal to about 4 parts by weight based on 100 parts by weight of the overlay material).

Since the metal alloy includes nickel and/or cobalt, the overlay material 70 may exhibit excellent corrosion-resistance. More specifically, the overlay material 70 may be substantially resistant to corrosion from seawater at an ambient temperature of from about −40° C. to about 50° C. Stated differently, the overlay material 70 minimizes oxidation of the surface of the fluid vessel 10 after internal exposure to seawater. As used herein, in contrast to freshwater, the terminology "seawater" refers to water having a salinity of from about 31 parts by volume to about 40 parts by volume based on 1 trillion parts by volume of seawater, i.e., about 31 ppt to about 40 ppt (about 3.1% to about 4%), and a density of about 1.025 g/ml at 4° C. Further, seawater includes dissolved salts of one or more ions selected from the group including chloride, sodium, sulfate, magnesium, calcium, potassium, bicarbonate, bromide, borate, strontium, fluoride, and combinations thereof. Seawater may include brackish, saline water, and brine.

Additionally, the overlay material 70 may exhibit a free corrosion potential, $E_{corr}$, of less than or equal to −0.200. As used herein, the terminology "free corrosion potential" refers to the absence of net electrical current flowing to or from the metal substrate 60 in seawater relative to a reference electrode. Further, the overlay material 70 may exhibit a corrosion rate of less than or equal to about 0.010 mils per year (1 mil=0.001 inch). As used herein, the terminology "corrosion rate" refers to a change in the metal substrate 60 and/or overlay material 70 caused by corrosion per unit of time and is expressed as an increase in corrosion depth per year. Therefore, the overlay material 70 may exhibit minimized susceptibility to localized corrosion from, for example, pitting and/or crack propagation.

While the application of the overlay material 70 will be discussed in greater detail below, in an as-deposited condition, the overlay material 70, such as EATONITE™ ABC-L1 may have a Rockwell C Scale Hardness of between 24 and 30 HRC (260-302 HV30 on a Vickers Hardness Scale, as measured in accordance with ISO test method 6507-1:2005). Through a work-hardening process, which will also be described in greater detail below, the overlay material 70 may achieve a hardness of from about 42 to 54 HRC (412 HV30 to about 577 HV30 on the Vickers scale). Therefore, the overlay material 70 may exhibit significant wear-resistance and/or anti-abrasion properties due to its hardness characteristics.

Referring to FIG. 3, an exemplary method of applying the overlay material 70 will now be discussed. As illustrated, in a fluid vessel 10 where the inlet structure 14, outlet structure 16, or central section 18 of the body structure 12 are made from tubular members, the tubular metal substrate 60 may first be secured within a rotating apparatus 100, such as by using a three jaw chuck 102. In other configurations, the metal substrate 60 may be secured using, for example, a four or more chuck or other similar clamping/securing means. Once secured, the rotating apparatus 100 may be operative to impart an angular rotation 104 to the metal substrate 60 that is substantially oriented about a central, longitudinal axis of the substrate 60.

To apply the overlay material to the inner surface 62 of the metal substrate 60, a fusing apparatus 110 may be held within the tubular substrate 60 by an extended arm 112. The arm may be substantially aligned with the metal substrate 60, such that it may translate in a longitudinal direction 114 and extend within the substrate 60. The fusing apparatus 110 may, for example, be an apparatus 110 that deposits the overlay material 70 onto the metal substrate 60 and binds it with the substrate 60 in a manner that results in a low amount of welding dilution. As used herein, "welding dilution" refers to the amount of the metal substrate 60 that is melted and subsequently alloyed into the overlay material 70. Welding dilution can often be expressed as a percentage or ratio of the substrate material that is present within the final cladding. In an embodiment, the amount of welding dilution attributable to the fusing procedure is less than about 7% by weight (i.e., less than or equal to about 7 parts by weight of the metal substrate within 100 parts by weight of the fused overlay material). In another embodiment, however, the amount of welding dilution attributable to the fusing procedure may be less than about 4% by weight (i.e., less than or equal to about 4 parts by weight of the metal substrate within 100 parts by weight of the fused overlay material). In comparison, applying the overlay material 70 using a typical submerged arc welding (SAW) or gas-metal arc welding (MIG) technique may result in a welding dilution of between 10% and 15% by weight.

In one embodiment, the fusing apparatus 110 may be a laser cladding apparatus, which may employ the use of a laser 116, such as a diode or a YAG laser, to fuse a deposited raw/powder form 118 of the overlay material 70 to the surface 62 of the substrate 60. During the procedure, the laser 116 may first liquefy a thin layer of the metal substrate 60, wherein the apparatus 110 may subsequently inject the powdered, raw overlay material 118 into the molten weld puddle created by the laser 116. The powdered overlay material 118 may then melt and alloy with the thin melted layer of the metal substrate 60. Such a procedure may minimize welding dilution and/or any corresponding iron pickup from the substrate 60 by minimizing the depth that the laser initially impinges into the substrate 60, thus minimizing the depth of the weld puddle. In one embodiment, a laser cladding procedure may be performed using a laser 116 that can achieve powers, for example, of up to 3.0 kW to 5.0 kW.

During the application of the overlay material 70 to the metal substrate 60, the rotating apparatus 100 may rotate the metal substrate 60 at a constant angular speed, while the fusing apparatus 110 may deposit and fuse the raw overlay material 118 to the surface 62. The fusing apparatus 110 may correspondingly translate in a longitudinal direction 114, thus creating an overlapping spiral pattern on the surface 62. The revolution speed of the metal substrate 60 may be dependent upon the physical dimensions of the substrate 60 (e.g., diameter), along with the desired thickness of the overlay material 70 (i.e., faster rotation speeds typically yield a thinner overlay). Furthermore, the translation speed of the fusing apparatus 110 may control the amount of overlap for successive beads of overlay material 70. In an embodiment, the cladding (i.e., the overlay material 70) may be applied with a 40 to 50% overlap on the previously laid bead. It is desirable to have an amount of overlap that sufficiently clads the entire inner surface 62, that is, an amount that prevents the metal substrate 60 from being exposed.

Figure 4:
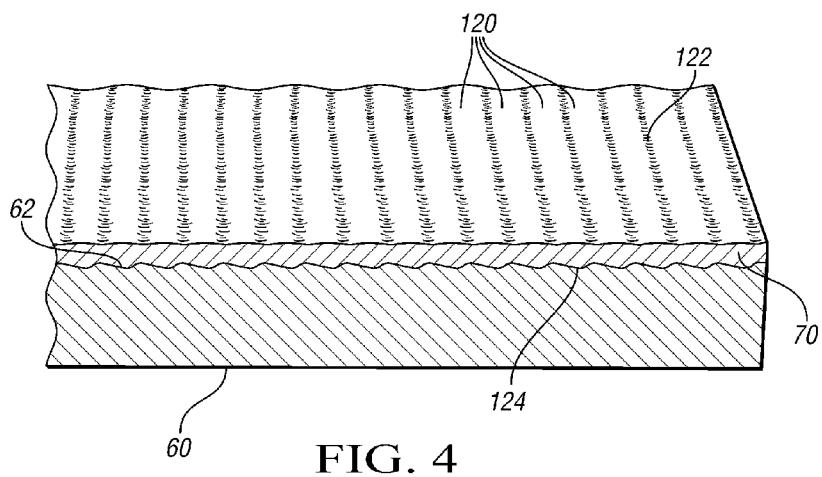
FIG. 4 is a schematic cross-sectional view of the metal substrate and overlay material provided in FIG. 3, and taken along Line 4-4.

FIG. 4 illustrates an exemplary schematic cross-sectional view of the metal substrate 60 and deposited overlay material 70 from FIG. 3, taken along Line 4-4. As illustrated, the overlay material 70 may be comprised of multiple rows 120 of overlay material 70 deposited on the surface 62 of the substrate 60. Absent any post-processing, such a procedure may result in a ridged appearance, where the amount of overlap for successive rows 120 may control the depth of the valleys 122 between the rows 120 (i.e., more overlap typically yields a smaller valley). Additionally, the surface 62 of the metal substrate 60 may appear to have an uneven depth. This uneven depth may be attributable to the fusing process, wherein the laser selectively melts a portion of the substrate 60 (e.g., deeper portion 124) to create a local alloy of the substrate 60 and overlay material 70.

In an embodiment, the overlay material 70 may be post-processed to improve the surface finish and/or to increase the hardness, such as through a work-hardening procedure. The overlay material 70 may be rough finished and/or work-hardened by any suitable process. For example, rough finishing may be selected from the group including machining, grinding, polishing, and combinations thereof. As a non-limiting example, the overlay material 70 may be rough finished by a grinding apparatus, such as a lathe.

Work hardening may plastically deform the overlay material 70 to thereby increase its hardness and wear-resistance. The overlay material 70 may be work hardened by any suitable process that produces a controlled amount of plastic deformation without cracking the overlay material 70. For example, the overlay material 70 may be work hardened by processes such as, but not limited to, roller burnishing, low plasticity burnishing (LPB), flow forming, draw forming, shot peening, polymer lapping, equal channel angular pressing (ECAP), electromagnetic shock forming, extrusion, cold forming, cold rolling, drawing, and combinations thereof. By way of one non-limiting example, work hardening may include roller burnishing the overlay material 70 with at least one non-ferrous roller.

Referring again to FIGS. 1-2, in an embodiment, each of the body structure 12, inlet structure 14, and outlet structure 16 may be respectively cladded with the overlay material 70 prior to joining the respective components 12, 14, 16 together. In one configuration, the inlet structure 14 and outlet structure 16 may each be respectively joined to the body structure 12 through a weld 140. To maintain the corrosion resistance at the joint, it may be desirable to perform the weld with a corrosion-resistant weld material. Because many corrosion-resistant welds are not as comparatively strong as steel welds, it may likewise be desirable to have a portion of the weld made from a steel-alloy.

Figure 5:
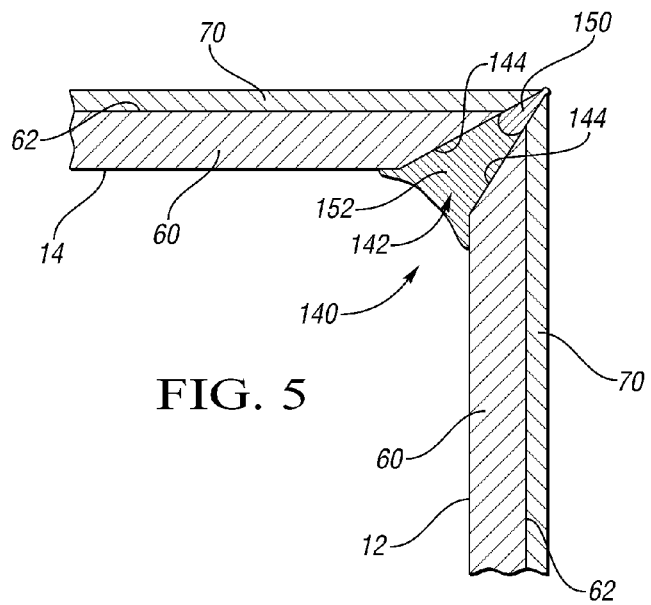
FIG. 5 is an enlarged schematic cross-sectional view of the area marked "FIG. 5" of FIG. 2, and illustrates an embodiment of a corrosion-resistant weld joint.

FIG. 5 illustrates a schematic enlargement of the area denoted "FIG. 5" from FIG. 2, and generally demonstrates an embodiment of a strong, yet corrosion-resistant weld joint 140. As illustrated, the weld joint 140 may be formed in a channel 142 provided between the body structure 12 and, for example, the inlet structure 14. The channel 142 may be formed by a fillet 144 provided on one or both of the body structure 12 and/or inlet structure 14. The weld 140 may generally be a layered weld that may include two or more layers: for example, a root weld 150, and an outer/filler weld 152. When welding from the outside of the vessel 10, the root weld 150 may be applied first, i.e., to the "root" of the channel 142, with the filler weld 152 being generally applied afterwards. The root weld 150 may be made using a generally corrosion-resistant material, such as, for example, INCONEL® 625 or EATONITE™ ABC-L1, and/or may include an element selected from the group including nickel, cobalt, chromium, and combinations thereof. The root weld 150 may join the overlay material 70 of the inlet structure 14 with the overlay material 70 of the body structure 12, and may substantially prevent liquid from bypassing the overlay material 70 to contact the metal substrate 60.

After the root weld 150 is in place, the filler weld 152 may be applied to further join the inlet structure 14 with the body structure 12. The filler weld 152 may be made using, for example, a ferrous material, such as a steel alloy that is suitably adapted for welding applications. The filler weld 152 may join the metal substrate 60 of the inlet structure 14 with the metal substrate 60 of the body structure 12. Likewise, the filler weld 152 may have a hardness that is comparable to the metal substrate 60, and provide a measure of strength to the joint.

As may be appreciated, and as generally illustrated in FIG. 1, the weld 140 may extend around the entire perimeter of the inlet structure-body structure seam in a manner that fluidly seals the inlet structure 14 to the body structure 12. Likewise, the outlet structure 16 may be sealed to the body structure 12 using a similar layered welding technique. As may be further appreciated, the weld 26 that joins the second end cap 22 to the central section of the body structure 12 may be a layered fillet weld (or other similar type of weld) that employs a corrosion resistant root weld to generally seal the overlay material 70, followed by a filler weld to provide enhanced strength.

Figure 6:
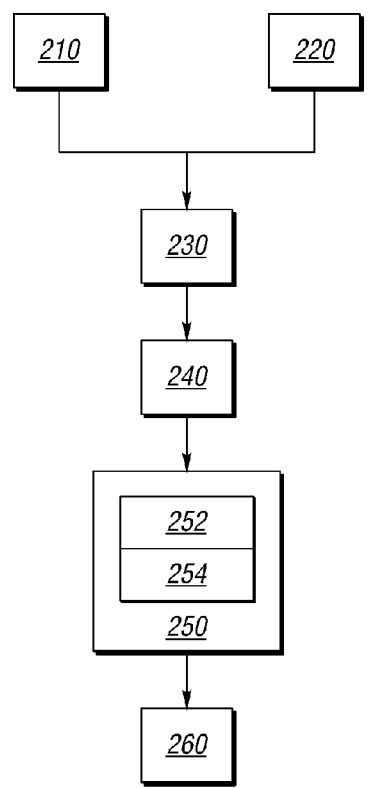
FIG. 6 is a flow diagram illustrating an embodiment of a method for manufacturing a fluid vessel with a corrosion and abrasion resistant interior cladding.

As generally illustrated in the flow diagram provided in FIG. 6, a method of manufacturing a seawater strainer may be similar to that described above, and may include providing a body structure, an inlet structure, and an outlet structure 210, and providing a powdered overlay material 220. Each of the respective structures may include a metal substrate that has a respective inner surface, and each may have an iron content of greater than or equal to about 90 to 95 percent iron by weight. Conversely, the powdered overlay material may have an iron content of less than or equal to about 7 percent by weight, and may include an element selected from the group including nickel, cobalt, chromium, and combinations thereof.

The method may further include fusing the overlay material to the inner surface of each of the respective body structure, inlet structure, and outlet structure through laser cladding 230. Once fused, the overlay material may be subject to post-processing 240, which may include rough finishing and/or work-hardening by any suitable process. For example, rough finishing may be selected from the group including machining, grinding, polishing, and combinations thereof. Likewise, the overlay material may be work hardened by processes such as, but not limited to, roller burnishing, low plasticity burnishing (LBP), flow forming, draw forming, shot peening, polymer lapping, equal channel angular pressing (ECAP), electromagnetic shock forming, extrusion, cold forming, cold rolling, drawing, and combinations thereof.

Following any post-processing 240, if applicable, the inlet structure and outlet structure may each be respectively welded to the body structure 250. In an embodiment, the welding 250 may include forming a root weld 252 and forming a filler weld 254, such as in a manner described with respect to FIG. 5. To provide a degree of corrosion-resistance, the root weld may include an element selected from the group including nickel, cobalt, chromium, and combinations thereof.

Finally, a filter media may be disposed within the body structure 260 of the seawater strainer. As generally described above with respect to FIG. 2, the filter media may be in fluid communication with each of the inlet structure and the outlet structure, and may be operatively positioned such that the inlet structure and the outlet structure are on substantially opposing sides of the filter media.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A fluid vessel comprising:
   a tubular body structure defining a cavity, the body structure including an overlay material surrounding the cavity, and including a metal substrate surrounding the overlay material;
   a tubular inlet structure defining a first channel, the first channel in fluid communication with the cavity, the inlet structure including an overlay material surrounding the first channel, and including a metal substrate surrounding the overlay material;
   a tubular outlet structure defining a second channel, the second channel in fluid communication with the cavity, the outlet structure including an overlay material surrounding the second channel, and including a metal substrate surrounding the overlay material;
   wherein the overlay material of each of the body structure, the inlet structure, and the outlet structure is fused to the respective metal substrate of the body structure, the inlet structure, and the outlet structure through laser cladding;
   wherein the inlet structure and outlet structure are each joined to the body structure through a layered weld;
   wherein at least one of the tubular inlet structure and the tubular outlet structure is transverse to the tubular body structure; and
   wherein the metal substrate includes iron in an amount that is greater than or equal to about 90 to 95 parts by weight based on 100 parts by weight of the metal substrate.

2. The fluid vessel of claim 1, wherein the overlay material has an iron content in an amount that is less than or equal to about 7 parts by weight based on 100 parts by weight of the overlay material.

3. The fluid vessel of claim 1, wherein the welding dilution of the overlay material attributable to the laser cladding is less than or equal to about 4 parts by weight of the metal substrate within 100 parts by weight of the fused overlay material.

4. The fluid vessel of claim 1, wherein the body structure includes a first end cap, a second end cap, and a central portion, the first end cap and second end cap being disposed on substantially opposing ends of the central portion; and wherein at least one of the first end cap and the second end cap is welded to the central portion.

5. The fluid vessel of claim 1, further comprising a filter media disposed within the cavity and in fluid communication with each of the first channel and the second channel, the filter media operatively positioned such that the first channel and the second channel are on substantially opposing sides of the filter media.

6. The fluid vessel of claim 5, wherein the filter media is a screen filter.

7. The fluid vessel of claim 1, wherein the overlay material includes an element selected from the group including nickel, cobalt, chromium, and combinations thereof.

8. The fluid vessel of claim 1, wherein, the layered weld including a root weld and a filler weld.

9. The fluid vessel of claim 8, wherein the root weld includes an element selected from the group including nickel, cobalt, chromium, and combinations thereof.

10. The fluid vessel of claim 1, wherein the overlay material has a hardness, measured on the Rockwell C Scale, of between 24 HRC and 30 HRC, or between 42 HRC and 54 HRC.

11. A seawater strainer comprising:
a tubular body structure defining a cavity, the body structure including an overlay material surrounding the cavity, and including a metal substrate surrounding the overlay material;
a tubular inlet structure defining a first channel, the first channel in fluid communication with the cavity, the inlet structure including an overlay material surrounding the first channel, and including a metal substrate surrounding the overlay material;
a tubular outlet structure defining a second channel, the second channel in fluid communication with the cavity, the outlet structure including an overlay material surrounding the second channel, and including a metal substrate surrounding the overlay material;
wherein at least one of the tubular inlet structure and the tubular outlet structure is transverse to the tubular body structure;
a filter media disposed within the cavity and in fluid communication with each of the first channel and the second channel, the filter media operatively positioned such that the first channel and the second channel are on substantially opposing sides of the filter media;
wherein the overlay material includes an element selected from the group including nickel, cobalt, chromium, and combinations thereof;
wherein the overlay material of each of the body structure, the inlet structure, and the outlet structure is fused to the respective metal substrate of the body structure, the inlet structure, and the outlet structure through laser cladding;
wherein the inlet structure and outlet structure are each joined to the body structure through a layered weld;
wherein the metal substrate includes iron in an amount that is greater than or equal to about 90 to 95 parts by weight based on 100 parts by weight of the metal substrate; and
wherein the welding dilution of the overlay material attributable to the laser cladding is less than or equal to about 4 parts by weight of the metal substrate within 100 parts by weight of the fused overlay material.

12. The seawater strainer of claim 11, wherein the overlay material has an iron content in an amount that is less than or equal to about 7 parts by weight based on 100 parts by weight of the overlay material.

13. The seawater strainer of claim 11, wherein the body structure includes a first end cap, a second end cap, and a central portion, the first end cap and second end cap being disposed on substantially opposing ends of the central portion; and wherein at least one of the first end cap and the second end cap is welded to the central portion.

14. The seawater strainer of claim 11, wherein, the layered weld including a root weld and a filler weld, and wherein the root weld includes an element selected from the group including nickel, cobalt, chromium, and combinations thereof.

15. The seawater strainer of claim 11, wherein the overlay material has a hardness, measured on the Rockwell C Scale, of between 24 HRC and 30 HRC, or between 42 HRC and 54 HRC.

16. A method of manufacturing a seawater strainer comprising:
fusing a powdered overlay material to the inner surfaces of a tubular body structure, a tubular inlet structure, and a tubular outlet structure through laser cladding; and
welding each of the inlet structure and outlet structure to the body structure through a layered weld, such that at least one of the tubular inlet structure and the tubular outlet structure is transverse to the tubular body structure;
wherein each of the body structure, the inlet structure, and the outlet structure include a metal substrate, the metal substrate having iron in an amount that is greater than or equal to about 90 to 95 parts by weight based on 100 parts by weight of the metal substrate; and
wherein the powdered overlay material includes an iron content that is less than or equal to about 7 parts by weight based on 100 parts by weight of the overlay material, and includes an element selected from the group including nickel, cobalt, chromium, and combinations thereof.

17. The method of claim 16, wherein welding each of the inlet structure and the outlet structure to the body structure includes forming a root weld and forming a filler weld; and wherein the root weld includes an element selected from the group including nickel, cobalt, chromium, and combinations thereof.

18. The method of claim 16, further comprising disposing a filter media within the body structure, the filter media being in fluid communication with each of the inlet structure and the outlet structure, the filter media operatively positioned such that the inlet structure and the outlet structure are on substantially opposing sides of the filter media.

19. The method of claim 16, further comprising post-processing the fused overlay material; and wherein the post-processing includes rough finishing or work-hardening.

\* \* \* \* \*